(12) United States Patent
Zou et al.

(10) Patent No.: US 12,092,211 B2
(45) Date of Patent: Sep. 17, 2024

(54) AXIALLY-LIMITED GUIDE DEVICE, PARKING MECHANISM, AND AUTOMOBILE

(71) Applicants: Zhejiang Geely Holding Group Co., Ltd, Zhejiang (CN); GEELY CHANGXING AUTOMATIC TRANSMISSION CO., LTD, Zhejiang (CN); ZHEJIANG GEELY POWER ASSEMBLY CO., LTD., Zhejiang (CN); NINGBO GEELY ROYAL ENGINE COMPONENTS CO., LTD., Zhejiang (CN); NINGBO UMD AUTOMATIC TRANSMISSION CO., LTD, Zhejiang (CN)

(72) Inventors: Chaoyang Zou, Zhejiang (CN); Chuang Yu, Zhejiang (CN); Yanjun Tan, Zhejiang (CN); Xiaozhe Lin, Zhejiang (CN); Ruiping Wang, Zhejiang (CN); Conghui An, Zhejiang (CN)

(73) Assignees: ZHEJIANG GEELY HOLDING GROUP CO., LTD, Zhejiang (CN); GEELY CHANGXING AUTOMATIC TRANSMISSION CO., LTD, Zhejiang (CN); ZHEJIANG GEELY POWER ASSEMBLY CO., LTD., Zhejiang (CN); NINGBO GEELY ROYAL ENGINE COMPONENTS CO., LTD., Zhejiang (CN); NINGBO UMD AUTOMATIC TRANSMISSION CO. LTD, Zhejiang (CN)

( * ) Notice: Subject to any disclaimer, the term of this patent is extended or adjusted under 35 U.S.C. 154(b) by 0 days.

(21) Appl. No.: 18/349,978

(22) Filed: Jul. 11, 2023

(65) Prior Publication Data
US 2023/0358309 A1 Nov. 9, 2023

Related U.S. Application Data

(63) Continuation of application No. PCT/CN2021/077434, filed on Feb. 23, 2021.

(51) Int. Cl.
*F16H 63/34* (2006.01)

(52) U.S. Cl.
CPC ..... *F16H 63/3433* (2013.01); *F16H 63/3425* (2013.01)

(58) Field of Classification Search
CPC ....... F16H 63/3416–3491; B60T 1/005; B60T 1/062
See application file for complete search history.

(56) References Cited

U.S. PATENT DOCUMENTS 3,213,968 A * 10/1965 Platz .................. F16H 63/3416
188/69
3,690,416 A * 9/1972 Yamada et al. ......... B60T 1/005
188/69

(Continued)

FOREIGN PATENT DOCUMENTS

CN 102481903 A 5/2012
CN 103791082 A 5/2014

(Continued)

OTHER PUBLICATIONS

International Search Report dated Nov. 25, 2021 in International Application No. PCT/CN2021/077434. English translation attached.

(Continued)

*Primary Examiner* — Ernesto A Suarez
*Assistant Examiner* — James J Taylor, II (57) ABSTRACT

Provided is an axially-limited guide device applied in a parking mechanism. The parking mechanism includes a (Continued)

parking pawl and a parking shift fork that is axially movable. The guide device includes a parking bracket assembly and a guide block. The guide block is configured to be slidably engaged with an execution member at an end of the parking shift fork to allow for a relative rotation of the parking pawl and a rotary shaft. The parking bracket assembly is configured to axially limit the parking pawl and guide the parking shift fork. The parking bracket assembly includes a limiting portion abutting against the guide block. The limiting portion is configured to limit an axial movement of the guide block when the execution member at the end of the parking shift fork is axially disengaged from the guide block. Also provided are a parking mechanism and an automobile.

20 Claims, 2 Drawing Sheets

(56) References Cited

U.S. PATENT DOCUMENTS

| | | | |
|---|---|---|---|
| 4,614,256 A | 9/1986 | Kuwayama et al. | |
| 5,295,412 A * | 3/1994 | Donato | B60T 1/005 |
| | | | 74/577 M |
| 8,240,448 B2 * | 8/2012 | Hongawara | F16D 63/006 |
| | | | 192/219.5 |
| 2014/0231213 A1 | 8/2014 | Isomura et al. | |
| 2018/0328489 A1 * | 11/2018 | Coats | F16H 63/3491 |
| 2019/0107196 A1 * | 4/2019 | Banshoya | F16H 63/3433 |
| 2020/0248806 A1 * | 8/2020 | Klein | F16H 63/3433 |

FOREIGN PATENT DOCUMENTS

| | | |
|---|---|---|
| CN | 211344004 U | 8/2020 |
| CN | 111623116 A | 9/2020 |
| CN | 112145682 A | 12/2020 |
| DE | 102011084392 A1 | 4/2013 |
| DE | 102015008709 A1 | 1/2016 |
| DE | 102018129314 A1 | 10/2019 |
| EP | 3464959 A1 | 4/2019 |
| JP | 07144616 A | 6/1995 |
| JP | H08216842 A | 8/1996 |
| JP | 2013127264 A | 6/2013 |
| WO | 2015063583 A1 | 5/2015 |
| WO | WO-2017211386 A1 * | 12/2017 ......... F16H 63/3425 |

OTHER PUBLICATIONS

Extended European Search Report from corresponding European Application No. EP21927109.5, dated Jan. 3, 2024.

* cited by examiner

AXIALLY-LIMITED GUIDE DEVICE, PARKING MECHANISM, AND AUTOMOBILE

CROSS-REFERENCE TO RELATED APPLICATIONS

This application is a continuation of International Application No. PCT/CN2021/077434, filed on Feb. 23, 2021, the entire disclosure of which is incorporated herein by reference.

FIELD

The specification relates to the technical field of automobile parts, and in particular, to an axially-limited guide device, a parking mechanism, and an automobile.

BACKGROUND

Electronic applications are more and more widely applied in modern automobiles, and an auto gear automobile is developed with the participation of high technology. In order to enable the auto gear automobile to limit its movement through a gear like a manual gear automobile, a P gear is set in an automatic gearbox. The P gear mainly uses a pawl and a ratchet in a parking mechanism as a locking mechanism and a locking gear, and the pawl can be engaged with the ratchet to directly fix a gearbox output shaft connected to wheels of the automobile, and the wheels can be locked through an axle shaft.

For the current transmissions, there are various types of commercial available parking mechanisms, and for parking mechanisms with a same structure, guide blocks also have different fixing manners. At present, most of guide blocks are fixed by the following four fixing methods. In a first fixing method, the guide block is formed into a special-shaped part and is positioned by means of a housing hole and fixed on a housing by means of two bolts. In a second fixing method, the guide block is formed into a guide plate through stamping forming and is positioned by means of a housing hole groove and fixed on the housing by means of two bolts. In a third fixing method, a rotary body guide block is positioned by means of a housing hole, and an axial displacement of the guide block is limited by two bolts and a press plate. In a fourth fixing method, a rotary body guide block is positioned by means of a housing hole, and an axial movement of the guide block is limited by an interference amount between the housing hole and an outer circle of the guide block.

According to a whole arrangement of the transmission, the guide block may be fixed by the fourth fixing method. This fourth fixing method has the advantage such as low space requirements and the disadvantage such as significant influence of strength and rigidity of the housing on a holding force of the guide block. With an influence of space, a wall thickness of a mounting hole, material rigidity of the guide block, and the like are insufficient to satisfy parking mechanism's requirements for a harsh operating condition, resulting in disengagement of the guide block during test.

In order to solve the problem of disengagement of the guide block, in combination with consideration for influences of space and cost, an axially-limited guide device, a parking mechanism, and an automobile are needed to be provided.

SUMMARY

According to some embodiments of the present disclosure, there is provided an axially-limited guide device and a parking mechanism, which have simple structures and low cost. By optimizing a structure of a bracket of the existing parking mechanism, a limiting portion of a parking bracket can press against a guide block to limit an axial displacement of the guide block. Thus, it is possible to ensure that the guide block has no interference with a parking pawl to avoid the risk of failure of a parking function of the pawl.

According to some embodiments of the present disclosure, there is provided an axially-limited guide device applied in a parking mechanism. The parking mechanism includes a parking bracket assembly and a guide block. The guide block is configured to be slidably engaged with an execution member at an end of the parking shift fork to allow for a relative rotation of the parking pawl and a rotary shaft. The parking bracket assembly is configured to axially limit the parking pawl and guide the parking shift fork. The parking bracket assembly includes a limiting portion abutting against the guide block. The limiting portion is configured to limit an axial movement of the guide block when the execution member at the end of the parking shift fork is axially disengaged from the guide block.

In some embodiments of the present disclosure, the guide block includes a first guide portion having a support surface. The limiting portion is in contact with the support surface.

In some embodiments of the present disclosure, an end of the limiting portion has a forced surface matching with the support surface.

In some embodiments of the present disclosure, the first guide portion has a first guide surface. A projection of the limiting portion on a radial plane of the guide block has no overlap with a projection of the first guide surface on the radial plane of the guide block.

In some embodiments of the present disclosure, the guide block includes a second guide portion having a second guide surface. A projection of the limiting portion on a radial plane of the guide block has no overlap with a projection of the second guide surface on the radial plane of the guide block.

In some embodiments of the present disclosure, the first guide surface is of a sector-ring shape. A straight line where one of side edges of the forced surface is located is tangent to an outer ring of the first guide surface.

In some embodiments of the present disclosure, the forced surface has a width greater than or equal to a difference between an outer arc radius and an inner arc radius of the first guide surface.

In some embodiments of the present disclosure, the limiting portion has a sector-ring-shaped longitudinal cross section.

In some embodiments of the present disclosure, the limiting portion has a third guide surface perpendicular to the forced surface. The third guide surface is configured to guide an axial sliding of the execution member.

In some embodiments of the present disclosure, the parking bracket assembly further includes a parking bracket. The parking bracket assembly including the limiting portion and the parking bracket is integrally formed.

In some embodiments of the present disclosure, the parking bracket assembly further includes a parking bracket connected to the limiting portion by welding.

According to some embodiments of the present disclosure, there is provided a parking mechanism. The parking mechanism includes a housing, a rotary shaft, a parking pawl, a parking shift fork, and the axially-limited guide device as described above. A parking bracket is fixedly connected to the housing by means of a bolt and two positioning pins and has a rotary shaft fitting hole. The parking pawl, the parking bracket, and the parking shift fork are sequentially sleeved over the rotary shaft. A parking torsion spring is disposed between the parking pawl and the rotary shaft and configured to reset the parking pawl. The execution member is disposed at the end of the parking shift fork. The parking shift fork is engaged with the guide block by the execution member to allow for a slidable connection between the guide block and the parking pawl.

In some embodiments of the present disclosure, an anti-rotation pin slot is defined on the parking bracket. An anti-rotation pin is disposed on the parking shift fork and slidably connected to the anti-rotation pin slot.

In some embodiments of the present disclosure, a guide block fitting hole is defined on the housing. The guide block is press-fitted in the guide block fitting hole through an interference fit.

According to some embodiments of the present disclosure, there is provided an automobile. The automobile includes the parking mechanism as described above.

According to the embodiments as described above, the present disclosure has the following technical effects.

1) The axially-limited guide device and the parking mechanism according to the embodiments of the present disclosure have simple structures and low cost. By optimizing the structure of the bracket of the existing parking mechanism, the limiting portion of the parking bracket can press against the guide block to limit the axial displacement of the guide block. Thus, it is possible to ensure that the guide block has no interference with the parking pawl to avoid the risk of failure of the parking function of the pawl.
2) By optimizing the structure of the bracket of the existing parking mechanism, it is possible for a same part to realize two functions, which can eliminate additional pressing plate and bolt and avoid a bolt hole from being additionally formed on the housing, thereby minimizing modification cost in the case of the modification.
3) Due to no additionally added parts, there is no influence on an assembling process, the existing production line, and a production device. In addition, for the existing parking mechanism, the existing spatial arrangement, and the existing test, modification and influence are minimum with high mass production reliability.

BRIEF DESCRIPTION OF THE DRAWINGS

In order to describe the technical solutions of the present disclosure more clearly, the accompanying drawings that need to be used in the description of the embodiments or the related art will be discussed briefly below. The accompanying drawings described below are only some embodiments of the present disclosure. For those of ordinary skill in the art, other drawings can be obtained based on these drawings without inventive efforts.

Here, reference numerals in the drawings are described below.

1—parking bracket assembly, 11—parking bracket, 2—guide block, 21—first guide portion, 211—first guide surface, 212—support surface, 22—second guide portion, 221—second guide surface, 3—limiting portion, 31—forced surface, 32—third guide surface, 4—rotary shaft, 5—parking pawl, 6—parking shift fork, 61—execution member, 62—anti—rotation pin, 7—parking torsion spring.

DETAILED DESCRIPTION

Technical solutions according to embodiments of the specification will be clearly and completely described below in combination with accompanying drawings of the embodiments of the specification. The embodiments described below are only a part, rather than all, of the embodiments of the present disclosure. On a basis of the embodiments in the specification, all other embodiments obtained by those of ordinary skill in the art without creative labor shall fall within the scope of the present disclosure.

According to embodiments of the present disclosure, there is provided an axially-limited guide device and a parking mechanism, which have a simple structure, a low cost, and the like. A structure of a bracket of an existing parking mechanism is optimized, enabling a limiting portion of a parking bracket to press against the guide block to limit an axial displacement of the guide block. Thus, it is possible to ensure that the guide block has no interference with the parking pawl to avoid a risk of failure of a parking function of a pawl.

In order to clarify and explain the above objects, features and advantages of the specification, the present disclosure will be further described in detail below in conjunction with the accompanying drawings and specific embodiments.

Figure 3:
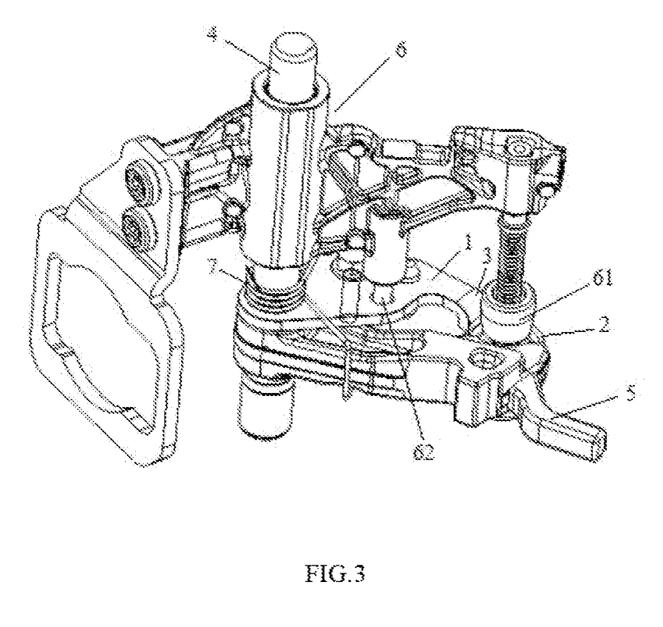
FIG. 3 is a schematic structural view of a parking mechanism provided by the present disclosure according to an embodiment of the present disclosure.

In an embodiment of the present disclosure, as illustrated in FIG. 3, a parking mechanism includes a housing, a rotary shaft 4, a parking pawl 5, a parking shift fork 6, and the axially-limited guide device as described above. A parking bracket 11 is fixedly connected to the housing by means of a bolt and two positioning pins. A rotary shaft fitting hole is defined on the parking bracket 11. The parking pawl 5, the parking bracket 11, and the parking shift fork 6 are sequentially sleeved over the rotary shaft 4. A parking torsion spring 7 for resetting the parking pawl 5 is disposed between the parking pawl 5 and the rotary shaft 4. An execution member 61 is disposed at the end of the parking shift fork 6. The parking shift fork is engaged with a guide block 2 by the execution member 61 to allow for a slidable connection between the guide block 2 and the parking pawl 5.

An anti-rotation pin slot is defined on the parking bracket 11. An anti-rotation pin 62 is disposed on the parking shift fork 6. The anti-rotation pin 62 is slidably connected into the anti-rotation pin slot. The parking shift fork 6 can prevent a relative rotation of the parking shift fork 6 and the rotary shaft 4 through an engagement between the anti-rotation pin 62 and the anti-rotation pin slot. A guide block fitting hole is defined on the housing. The guide block 2 is press-fitted in the guide block fitting hole through an interference fit.

The parking bracket 11 is mounted on the housing by means of one bolt and two positioning pins. The rotary shaft 4 is supported by a transmission housing hole, a clutch housing hole, and the parking bracket 11. According to an application situation, the rotary shaft 4 may be supported by the parking bracket 11, or may not be supported by the parking bracket 11. The rotary shaft 4 is axially limited by the parking bracket 11 and a bottom of the transmission housing hole. The parking shift fork 6 is sleeved over the rotary shaft 4 to provide support. The anti-rotation pin 62 on the parking shift fork 6 is inserted into an anti-rotation pin fitting hole of the parking support 11 to provide an anti-rotation function. The execution member 61 is disposed on the parking shift fork 6. A guide sleeve is disposed on the parking pawl 5, and the execution member 61 passes through the guide sleeve. The guide sleeve is of a structure recessed inwards and having a U-shaped surface. The parking shift fork 6 is slidably connected to the parking pawl 5 through an engagement of the guide sleeve with the execution member 61. The execution member 61 is stably slidable along the guide sleeve. Under the action of the rotary shaft 4 and the parking bracket 11, the parking shift fork moves axially to realize engagement or disengagement of a P gear. The parking pawl 5 is sleeved over the rotary shaft 4. An axial displacement of the parking pawl 5 is limited by an end surface of the housing and the parking bracket 11. The guide block 2 is press-fitted in a housing hole through the interference fit. The limiting portion 3 presses against the guide block 2 to provide an axial limiting.

Figure 1:
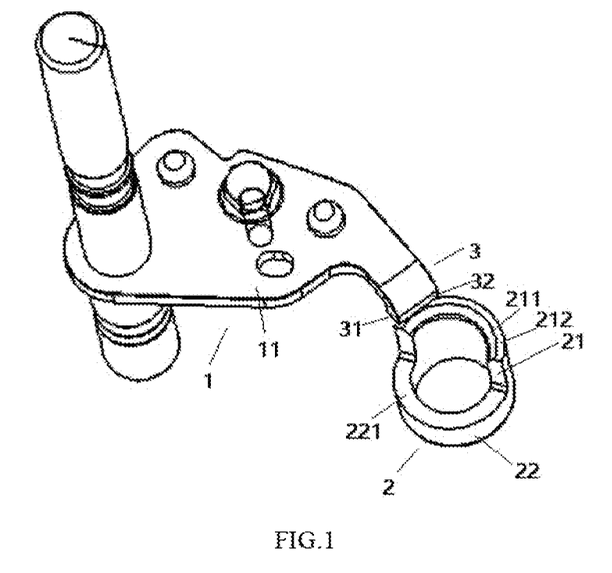
FIG. 1 is a schematic structural view of an axially-limited guide device according to an embodiment of the present disclosure.
Figure 2:
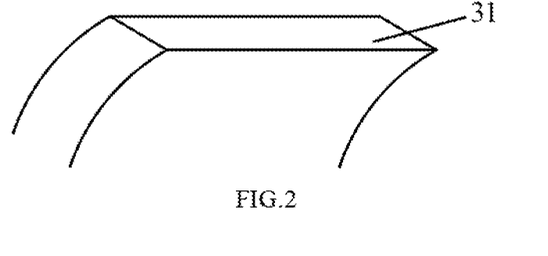
FIG. 2 is a schematic view of a forced surface in an axially-limited guide device according to an embodiment of the present disclosure.

Reference is made to FIG. 1 and FIG. 2 showing an axially-limited guide device applied in a parking mechanism. The parking mechanism includes a parking pawl 5 and a parking shift fork 6 that is axially movable. The guide device includes a parking bracket assembly 1 and a guide block 2. The guide block 2 is configured to be slidably engaged with an execution member 61 at an end of the parking shift fork 6 to allow for a relative rotation of the parking pawl 5 and a rotary shaft 4. The parking bracket assembly 1 is configured to axially limit the parking pawl 5 and guide the parking shift fork 6. The parking bracket assembly 1 includes a limiting portion 3 abutting against the guide block 2. The limiting portion 3 is configured to limit an axial movement of the guide block 2 when the execution member 61 at the end of the parking shift fork 6 is axially disengaged from the guide block 2. By optimizing a structure of the bracket of the existing parking mechanism to press the limiting portion of the parking bracket against the guide block, the axial displacement of the guide block can be limited. Thus, it is possible to ensure that the guide block has no interference with the parking pawl to avoid a risk of failure of a parking function of the pawl.

The guide block 2 includes a first guide portion 21 having a support surface 212. The limiting portion 3 is in contact with the support surface 212. An end of the limiting portion 3 has a forced surface 31 matching with the support surface 212. Through an engagement of the forced surface 31 and the support surface 212, a stress between the parking bracket 11 and the guide block 2 is stronger.

The first guide portion 21 has a first guide surface 211. A projection of the limiting portion 3 on a radial plane of the guide block 2 has no overlap with a projection of the first guide surface 211 on the radial plane of the guide block 2. The guide block 2 includes a second guide portion 22 having a second guide surface 221. A projection of the limiting portion 3 on a radial plane of the guide block 2 ha no overlap with a projection of the second guide surface 221 on the radial plane of the guide block 2. The limiting portion 3 is disposed on the support surface 212, and has no overlap with both the first guide surface 211 of the first guide portion 21 and the second guide surface 221 of the second guide portion 22, which can ensure that a guiding effect of the guide block 2 on the execution member 61 is not affected while the limiting portion 3 severs as a pressing plate to press against the guide block 2. The first guide surface 211 has a sector-ring shape. In this case, a straight line where one of side edges of the forced surface 31 is located is tangent to an outer ring of the first guide surface 211. Therefore, the stress between the limiting portion 3 and the guide block 2 is stronger without influence of the limiting portion 3 on the guiding of the guide block 2.

The forced surface 31 has a width greater than or equal to a difference between an outer arc radius and an inner arc radius of the first guide surface 211. In a case where the guide block 2 has no change, a contact area between the forced surface 31 of the limiting portion 3 and the support surface 212 of the guide block 2 is maximized, and thus the stress between the limiting portion 3 and the guide block 2 is stronger. In this embodiment, the forced surface 31 is square, and the width of the forced surface 31 is a length of a shorter side of the forced surface. In other embodiments, the forced surface may have a non-square shape. In this case, the width of the forced surface 31 is a vertical distance between two longer sides of the forced surface.

In the embodiment, the limiting portion 3 has a sector-ring-shaped longitudinal cross section. In other embodiments, the limiting portion 3 has an irregular longitudinal cross-section composed of two curves and two short straight lines. The parking bracket assembly 1 further includes a parking bracket 11. The parking bracket assembly 1 including the limiting portion 3 and the parking bracket 11 is integrally formed. On the basis of the existing parking bracket 11, by lengthening the parking bracket 11 and bending the lengthened portion, the parking bracket 11 severs as the pressing plate to press against the guide block 2 to limit the axial displacement of the guide block 2. By optimizing the structure of the bracket of the existing parking mechanism, it is possible for a same part to realize two functions, which can eliminate additional pressing plate and bolt and avoid a bolt hole from being additionally formed on the housing, thereby minimizing modification cost in a case of the modification. Due to no additionally added parts, there is no influence on an assembling process, the existing production line, and a production device. In addition, for the existing parking mechanism, the existing spatial arrangement, and the existing test, modification and influence are minimum with high mass production reliability.

For the parking mechanism, the parking bracket assembly 1 is mainly used to support the rotary shaft 4 and to axially stop the parking pawl 5 to axially limit the parking pawl 5. The anti-rotation pin 62 is mounted in the parking shift fork 6 through the interference fit. The anti-rotation pin 62 is inserted into the anti-rotation pin slot of the parking bracket 11 to guide the parking shift fork 6. The guiding is implemented by the anti-rotation pin 62 and the anti-rotation pin slot of the parking bracket 11 during the engagement or disengagement of the P gear. The parking bracket 11 is lengthened and bent to form the limiting portion 3. The limiting portion 3 can press against the guide block 2 to limit the axial displacement of the guide block 2.

In another embodiment of the present disclosure, this embodiment is different from the above embodiment in that the limiting portion 3 has a third guide surface 32.

Reference is made to FIG. 3 showing a parking mechanism according to some embodiments of the present disclosure. The parking bracket 11 is mounted on the housing by means of one bolt and two positioning pins. The rotary shaft 4 is supported by a transmission housing hole, a clutch housing hole, and the parking bracket 11. According to an application situation, the rotary shaft 4 may be supported by the parking bracket 11, or may not be supported by the parking bracket 11. The rotary shaft 4 is axially limited by the parking bracket 11 and a bottom of the transmission housing hole. The parking shift fork 6 is sleeved over the rotary shaft 4 to provide support. The anti-rotation pin 62 on the parking shift fork 6 is inserted into an anti-rotation pin fitting hole of the parking support 11 to provide an anti-rotation function. The execution member 61 is disposed on the parking shift fork 6. A guide sleeve is disposed on the parking pawl 5, and the execution member 61 passes through the guide sleeve. The guide sleeve is of a structure recessed inwards and having a U-shaped surface. The parking shift fork 6 is slidably connected to the parking pawl 5 through an engagement of the guide sleeve with the execution member 61. The execution member 61 is stably slidable along the guide sleeve. Under the action of the rotary shaft 4 and the parking bracket 11, the parking shift fork moves axially to realize engagement or disengagement of a P gear. The parking pawl 5 is sleeved over the rotary shaft 4. An axial displacement of the parking pawl 5 is limited by an end surface of the housing and the parking bracket 11. The guide block 2 is press-fitted in a housing hole through the interference fit. The limiting portion 3 presses against the guide block 2 to provide an axial limiting.

Reference is made to FIG. 1 and FIG. 2 showing an axially-limited guide device applied in a parking mechanism. The parking mechanism includes a parking pawl 5 and a parking shift fork 6 that is axially movable. The guide device includes a parking bracket assembly 1 and a guide block 2. The guide block 2 is configured to be slidably engaged with an execution member 61 at an end of the parking shift fork 6 to allow for a relative rotation of the parking pawl 5 and a rotary shaft 4. The parking bracket assembly 1 is configured to axially limit the parking pawl 5 and guide the parking shift fork 6. The parking bracket assembly 1 includes a limiting portion 3 abutting against the guide block 2. The limiting portion 3 is configured to limit an axial movement of the guide block 2 when the execution member 61 at the end of the parking shift fork 6 is axially disengaged from the guide block 2. The limiting portion 3 has a third guide surface 32 perpendicular to the forced surface 31. The third guide surface 32 is configured to guide and limit an axial sliding of the execution member 61.

The guide block 2 includes a first guide portion 21 having a support surface 212. The limiting portion 3 is in contact with the support surface 212. An end of the limiting portion 3 has a forced surface 31 matching with the support surface 212. Through an engagement of the forced surface 31 and the support surface 212, a stress between the parking bracket 11 and the guide block 2 is stronger.

The first guide portion 21 has a first guide surface 211. A projection of the limiting portion 3 on a radial plane of the guide block 2 has no overlap with a projection of the first guide surface 211 on the radial plane of the guide block 2. The guide block 2 includes a second guide portion 22 having a second guide surface 221. A projection of the limiting portion 3 on a radial plane of the guide block 2 has no overlap with a projection of the second guide surface 221 on the radial plane of the guide block 2. The limiting portion 3 is disposed on the support surface 212, and has no overlap with both the first guide surface 211 of the first guide portion 21 and the second guide surface 221 of the second guide portion 22, which can ensure that a guiding effect of the guide block 2 on the execution member 61 is not affected while the limiting portion 3 severs as a pressing plate to press against the guide block 2.

The forced surface 31 has a width greater than or equal to a difference between an outer arc radius and an inner arc radius of the first guide surface 211. In a case where the guide block 2 has no change, a contact area between the forced surface 31 of the limiting portion 3 and the support surface 212 of the guide block 2 is maximized, and thus the stress between the limiting portion 3 and the guide block 2 is stronger. In this embodiment, the forced surface 31 is square, and the width of the forced surface 31 is a length of a shorter side of the forced surface. In other embodiments, the forced surface may have a non-square shape. In this case, the width of the forced surface 31 is a vertical distance between two longer sides of the forced surface.

In another embodiment of the present disclosure, this embodiment is different from the above embodiments in different connecting manner between the parking bracket 11 and the limiting portion 3.

Reference is made to FIG. 3 showing a parking mechanism according to some embodiments of the present disclosure. The parking bracket 11 is mounted on the housing by means of one bolt and two positioning pins. The rotary shaft 4 is supported by a transmission housing hole, a clutch housing hole, and the parking bracket 11. According to an application situation, the rotary shaft 4 may be supported by the parking bracket 11, or may not be supported by the parking bracket 11. The rotary shaft 4 is axially limited by the parking bracket 11 and a bottom of the transmission housing hole. The parking shift fork 6 is sleeved over the rotary shaft 4 to provide support. The anti-rotation pin 62 on the parking shift fork 6 is inserted into an anti-rotation pin fitting hole of the parking support 11 to provide an anti-rotation function. The execution member 61 is disposed on the parking shift fork 6. A guide sleeve is disposed on the parking pawl 5, and the execution member 61 passes through the guide sleeve. The guide sleeve is of a structure recessed inwards and having a U-shaped surface. The parking shift fork 6 is slidably connected to the parking pawl 5 through an engagement of the guide sleeve with the execution member 61. The execution member 61 is stably slidable along the guide sleeve. Under the action of the rotary shaft 4 and the parking bracket 11, the parking shift fork moves axially to realize engagement or disengagement of a P gear. The parking pawl 5 is sleeved over the rotary shaft 4. An axial displacement of the parking pawl 5 is limited by an end surface of the housing and the parking bracket 11. The guide block 2 is press-fitted in a housing hole through the interference fit. The limiting portion 3 presses against the guide block 2 to provide an axial limiting.

Reference is made to FIG. 1 and FIG. 2 showing an axially-limited guide device applied in a parking mechanism. The parking mechanism includes a parking pawl 5 and a parking shift fork 6 that is axially movable. The guide device includes a parking bracket assembly 1 and a guide block 2. The guide block 2 is configured to be slidably engaged with an execution member 61 at an end of the parking shift fork 6 to allow for a relative rotation of the parking pawl 5 and a rotary shaft 4. The parking bracket assembly 1 is configured to axially limit the parking pawl 5 and guide the parking shift fork 6. The parking bracket assembly 1 includes a limiting portion 3 abutting against the guide block 2. The limiting portion 3 is configured to limit an axial movement of the guide block 2 when the execution member 61 at the end of the parking shift fork 6 is axially disengaged from the guide block 2.

The parking bracket assembly 1 further includes a parking bracket 11 connected to the limiting portion 3 by welding. On the basis of existing parking bracket 11, optimization is performed by welding the limiting portion 3 on the parking bracket 11, it is possible for a same part to realize two functions, which can eliminate additional pressing plate and bolt and avoid a bolt hole from being additionally formed on the housing, thereby minimizing modification cost in a case of the modification. Since only the limiting portion is additionally added without other additionally added parts, there is no influence on an assembling process, the existing production line, and a production device. In addition, for the existing parking mechanism, the existing spatial arrangement, and the existing test, modification and influence are minimum with high mass production reliability.

The guide block 2 includes a first guide portion 21 having a support surface 212. The limiting portion 3 is in contact with the support surface 212. An end of the limiting portion 3 has a forced surface 31 matching with the support surface 212. Through an engagement of the forced surface 31 and the support surface 212, a stress between the parking bracket 11 and the guide block 2 is stronger.

The first guide portion 21 has a first guide surface 211. A projection of the limiting portion 3 on a radial plane of the guide block 2 has no overlap with a projection of the first guide surface 211 on the radial plane of the guide block 2. The guide block 2 includes a second guide portion 22 having a second guide surface 221. A projection of the limiting portion 3 on a radial plane of the guide block 2 has no overlap with a projection of the second guide surface 221 on the radial plane of the guide block 2. The limiting portion 3 is disposed on the support surface 212, and has no overlap with both the first guide surface 211 of the first guide portion 21 and the second guide surface 221 of the second guide portion 22, which can ensure that a guiding effect of the guide block 2 on the execution member 61 is not affected while the limiting portion 3 severs as a pressing plate to press against the guide block 2.

The forced surface 31 has a width greater than or equal to a difference between an outer arc radius and an inner arc radius of the first guide surface 211. In a case where the guide block 2 has no change, a contact area between the forced surface 31 of the limiting portion 3 and the support surface 212 of the guide block 2 is maximized, and thus the stress between the limiting portion 3 and the guide block 2 is stronger. In this embodiment, the forced surface 31 is square, and the width of the forced surface 31 is a length of a shorter side of the forced surface. In other embodiments, the forced surface may have a non-square shape. In this case, the width of the forced surface 31 is a vertical distance between two longer sides of the forced surface.

An operation principle of the present disclosure will be described below.

1) The parking bracket 11 is mounted on the housing by means of one bolt and two positioning pins. The rotary shaft 4 is supported by the transmission housing hole, the clutch housing hole, and the parking bracket 11. According to an application situation, the rotary shaft 4 may be supported by the parking bracket 11, or may not be supported by the parking bracket 11. The rotary shaft 4 is axially limited by the parking bracket 11 and the bottom of the transmission housing hole. The parking shift fork 6 is sleeved over the rotary shaft 4 to provide support. The anti-rotation pin 62 on the parking shift fork 6 is inserted into an anti-rotation pin fitting hole of the parking support 11 to provide an anti-rotation function. Under the action of the rotary shaft 4 and the parking bracket 11, the parking shift fork moves axially to realize engagement or disengagement of the P gear. The parking pawl 5 is sleeved over the rotary shaft 4. An axial displacement of the parking pawl 5 is limited by an end surface of the housing and the parking bracket 11. The guide block 2 is press-fitted in a housing hole through the interference fit. The limiting portion 3 presses against the guide block 2 to provide an axial limiting.

2) The execution member 61 is disposed on the parking shift fork 6. A guide sleeve is disposed on the parking pawl 5, and the execution member 61 passes through the guide sleeve. The guide sleeve is of a structure recessed inwards and having a U-shaped surface. The parking shift fork 6 is slidably connected to the parking pawl 5 through an engagement of the guide sleeve with the execution member 61. The execution member 61 is stably slidable along the guide sleeve.

3) When the P gear is engaged, the parking shift fork 6 moves axially, the execution member 61 is guided and limited by the first guide portion 21 of the guide block 2 to be inserted into a slot in the middle of the guide block 2, and during the movement, the execution member 61 slides relative to the guide sleeve of the parking shift fork 6. The parking pawl 5 is guided by the second guide portion 22 of the guide block 2 and rotates relative to the rotary shaft 4 away from the guide block 2, so as to realize the engagement of the P gear. When the P gear is disengaged, the execution member 61 moves away from the guide block, and the parking pawl 5 rotates towards the guide block 2 by means of the parking torsion spring 7 and through the guiding of the second guide portion 22 of the guide block 2 to return to an original position, so as to realize the disengagement of the P gear.

According to the embodiments as described above, the present disclosure has the following technical effects.

1) The axially-limited guide device and the parking mechanism according to the embodiments of the present disclosure have simple structures and low cost. By optimizing the structure of the bracket of the existing parking mechanism, the limiting portion of the parking bracket can press against the guide block to limit the axial displacement of the guide block. Thus, it is possible to ensure that the guide block has no interference with the parking pawl to avoid the risk of failure of the parking function of the pawl.

2) By optimizing the structure of the bracket of the existing parking mechanism, it is possible for a same part to realize two functions, which can eliminate additional pressing plate and bolt and avoid a bolt hole from being additionally formed on the housing, thereby minimizing modification cost in the case of the modification.

3) Due to no additionally added parts, there is no influence on an assembling process, the existing production line, and a production device. In addition, for the existing parking mechanism, the existing spatial arrangement, and the existing test, modification and influence are minimum with high mass production reliability.

Specific examples are used herein to illustrate the principle and implementations of the present disclosure. The above description of the embodiments is merely used to help understand the method and its core idea of the present disclosure. Also, for those of ordinary skill in the art, changes may be made to specific implementations and an application range based on the idea of the present disclosure. In addition, the content of the specification should not be construed as a limitation to the present disclosure.

What is claimed is:

1. An axially-limited guide device, applied in a parking mechanism comprising a parking pawl and a parking shift fork that is axially movable, the axially-limited guide device comprising:
   a parking bracket assembly configured to axially limit the parking pawl and guide the parking shift fork; and
   a guide block configured to be slidably engaged with an execution member at an end of the parking shift fork to allow for a relative rotation of the parking pawl and a rotary shaft, wherein:
   the parking bracket assembly comprises a limiting portion abutting against the guide block, the limiting portion being configured to limit an axial movement of the guide block when the execution member at the end of the parking shift fork is axially disengaged from the guide block.

2. The axially-limited guide device according to claim 1, wherein the guide block comprises a first guide portion having a support surface, the limiting portion being in contact with the support surface.

3. The axially-limited guide device according to claim 2, wherein an end of the limiting portion has a forced surface matching with the support surface.

4. The axially-limited guide device according to claim 3, wherein:
   the first guide portion has a first guide surface; and
   a projection of the limiting portion on a radial plane of the guide block has no overlap with a projection of the first guide surface on the radial plane of the guide block.

5. The axially-limited guide device according to claim 4, wherein:
   the first guide surface is of a sector-ring shape; and
   a straight line where one of side edges of the forced surface is located is tangent to an outer ring of the first guide surface.

6. The axially-limited guide device according to claim 5, wherein the forced surface has a width greater than or equal to a difference between an outer arc radius and an inner arc radius of the first guide surface.

7. The axially-limited guide device according to claim 5, wherein the limiting portion has a third guide surface perpendicular to the forced surface, the third guide surface being configured to guide an axial sliding of the execution member.

8. The axially-limited guide device according to claim 1, wherein:
   the guide block comprises a second guide portion having a second guide surface; and
   a projection of the limiting portion on a radial plane of the guide block has no overlap with a projection of the second guide surface on the radial plane of the guide block.

9. The axially-limited guide device according to claim 1, wherein the limiting portion has a sector-ring-shaped longitudinal cross section.

10. The axially-limited guide device according to claim 1, wherein:
    the parking bracket assembly further comprises a parking bracket; and
    the parking bracket assembly comprising the limiting portion and the parking bracket is integrally formed.

11. The axially-limited guide device according to claim 1, wherein the parking bracket assembly further comprises a parking bracket connected to the limiting portion by welding.

12. A parking mechanism, comprising:
    a housing;
    a rotary shaft;
    a parking pawl;
    a parking shift fork; and
    an axially-limited guide device, comprising:
    a parking bracket assembly configured to axially limit the parking pawl and guide the parking shift fork; and
    a guide block configured to be slidably engaged with an execution member at an end of the parking shift fork to allow for a relative rotation of the parking pawl and the rotary shaft, wherein:
    the parking bracket assembly comprises a limiting portion abutting against the guide block, the limiting portion being configured to limit an axial movement of the guide block when the execution member at the end of the parking shift fork is axially disengaged from the guide block;
    a parking bracket is fixedly connected to the housing by means of a bolt and two positioning pins and has a rotary shaft fitting hole;
    the parking pawl, the parking bracket, and the parking shift fork are sequentially sleeved over the rotary shaft;
    a parking torsion spring is disposed between the parking pawl and the rotary shaft and configured to reset the parking pawl;
    the execution member is disposed at the end of the parking shift fork; and
    the parking shift fork is engaged with the guide block by the execution member to allow for a slidable connection between the guide block and the parking pawl.

13. The parking mechanism according to claim 12, wherein:
    an anti-rotation pin slot is defined on the parking bracket; and
    an anti-rotation pin is disposed on the parking shift fork and slidably connected to the anti-rotation pin slot.

14. The parking mechanism according to claim 12, wherein a guide block fitting hole is defined on the housing, the guide block being press-fitted in the guide block fitting hole through an interference fit.

15. The parking mechanism according to claim 12, wherein the guide block comprises a first guide portion having a support surface, the limiting portion being in contact with the support surface.

16. The parking mechanism according to claim 15, wherein an end of the limiting portion has a forced surface matching with the support surface.

17. The parking mechanism according to claim 16, wherein:
    the first guide portion has a first guide surface; and
    a projection of the limiting portion on a radial plane of the guide block has no overlap with a projection of the first guide surface on the radial plane of the guide block.

18. The parking mechanism according to claim 17, wherein:
    the first guide surface is of a sector-ring shape; and
    a straight line where one of side edges of the forced surface is located is tangent to an outer ring of the first guide surface.

19. The parking mechanism according to claim 12, wherein:
    the guide block comprises a second guide portion having a second guide surface; and a projection of the limiting portion on a radial plane of the guide block has no overlap with a projection of the second guide surface on the radial plane of the guide block.

20. An automobile, comprising the parking mechanism according to claim 12.

\* \* \* \* \*